United States Patent Office 3,230,696
Patented Jan. 25, 1966

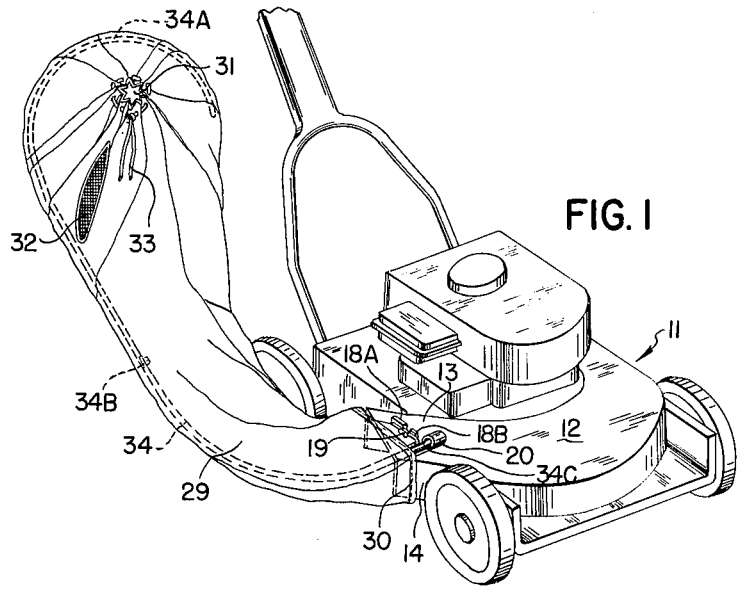

3,230,696
BAG-SUPPORTING MEANS FOR MOWERS
Harry Allen Liljenberg, Cleveland, Ohio, assignor to The M. T. & D. Company, a corporation of Ohio
Filed Apr. 2, 1964, Ser. No. 356,772
10 Claims. (Cl. 56—202)

My invention relates to means for supporting a bag adjacent to the port of the discharge chute of a mower for receiving material discharged from the port.

An object of my invention is to provide new and useful support means whereby a receptacle, such as a canvas bag, may be mounted in position adjacent a mower for receiving material, such as grass clippings, leaves, and the like, from the port of the mower's discharge chute.

Another object is the provision of a bracket and bag-supporting arm so constructed and arranged that the bag may be readily mounted and demounted from position on the mower.

Another object is the provision of an improved bracket mountable on the discharge chute of a mower adapted for ready mounting and demounting of a bag-supporting arm thereto.

Another object is the provision of an improved bag-supporting arm arranged for holding the mouth of a bag in alignment with the discharge chute of a mower to receive material discharged therefrom and for ready attachment and detachment of a bracket on the mower chute.

Other objects and a fuller understanding of the invention may be had by referring to the following description and claims, taken in conjunction with the accompanying drawings, in which:

FIGURE 1 is a perspective view of a rotary type mower of the usual type for cutting grass to which my improved bag-mounting means has been attached in operative position;

FIGURE 2 is a detailed view illustrating the mounting of my bag-supporting arm to my bracket, the bag-supporting arm being tilted or rotated in an initial position during its attachment to the bracket;

FIGURE 3 is a view showing my bag-supporting arm in its final position in the mounting of the arm to the bracket on the discharge chute, this view illustrating in greater detail the position of the mounting arm on the bracket as shown in FIGURE 1;

FIGURE 4 is a plan view of my improved bracket, showing in phantom lines the lower portion of the bag-supporting arm which engages the bracket; and FIGURE 5 is a view of the lower portion of my bag-supporting arm, illustrating the detail of the mounting of the mouth portion of the bag to a frame secured to the lower portion of the bag-supporting arm.

My invention is adapted to be applied to a rotary grass mower, which in FIGURE 1 has been denoted generally by the reference character 11. In the type of mower illustrated, there is a discharge chute 12 which conducts grass clippings, leaves and other such material outwardly of the mower housing generally tangentially of the rotating cutting blades. In some mowers, the discharge chute is directed forwardly of the mower, in some it is directed rearwardly of the mower, and in some it is discharged outwardly from the side of the mower, which is more usual and which is the arrangement illustrated in FIGURE 1. My invention is adapted for supporting a bag to the mower adjacent the port of the discharge chute regardless of the general disposition or arrangement of the discharge chute.

The discharge chute illustrated has a top wall 13 and depending downwardly therefrom are two spaced side walls 14 and 15. The lower portion of the discharge chute is usually open. The lower edges of the side walls 14 and 15 are raised somewhat from the level of the ground surface over which the mower travels.

My improved bracket is denoted generally by the reference character 16 and is preferably made of a metal stamping to the form illustrated and here described. The bracket 16 has a flat plate portion 17 which is adapted to be secured to the top wall 13 of the discharge chute. Nut and bolt assemblies 26 and 27 extend through slots or openings 22 and 23 in the flat plate portion 17 and through suitable openings in the upper wall 13 of the chute 12. The openings 22 and 23 are elongated as illustrated for accommodating adjustments required in the positioning of the bracket 16. Also provided in the flat plate portion 17 are two openings 24 and 25 which accommodate nut and bolt assemblies which may be utilized therein when the bracket member 16 is positioned in another arrangement on the chute. The openings 22, 23, 24 and 25 are so shaped, arranged and dimensioned that the bracket may be universally mounted on a large number of types of mowers having variously arranged and directed discharge chutes.

Turned upwardly along one of the longitudinal edges of the bracket member 16 and extending upwardly from the flat plate portion 17 is a confining and abutting wall made up of flange portions 18A and 18B. Intermediate the aligned ends of the upturned flanges 18A and 18B, the metal is cut inwardly and thence bent upwardly from the plane of the flat plate portion 17 to form the flange 19 which provides a detention means. It is to be noted that the flanges 18A and 18B together are in a vertical plane spaced from and parallel to a vertical plane through the flange 19. Between these vertical planes, there is a longitudinal open space which is open at the top.

The one end of the bracket member 16 and closest to the forward wall 14 of the chute the metal is turned upwardly and around to form a socket portion or sleeve 20. The axis of this socket portion 20 is generally parallel to the longitudinal axis of the chute 12 adjacent its port. The socket portion 20 is open and has a cylindrical bore therethrough. At the forward edge of the flat plate portion 17 the metal is turned upwardly in an arcuate curve to form a guiding portion 21 which is in alignment with the forward wall of the socket portion 20, the guiding portion 21 extending upwardly but a short distance from the plane of the flat plate portion 17. The axis of the arcuate upturned portion 21 coincides with the axis of the bore of the socket portion 20.

A bag for receiving grass clippings, leaves and other material discharged from the mower through its discharge chute is denoted by the reference character 29. The bag 29 is made of fabric, sheet plastic or other suitable material. An upper enlarged end portion of the bag 29 is adapted to be opened at 31 in the usual manner by loosening a drawstring 33 so as to enlarge the opening 31. There is a mesh-covered opening 32 provided as an air outlet for the bag whereby air which blows grass clippings, leaves and the like into the bag may escape from the upper end portion of the bag, the mesh material restraining clippings, leaves and other material from escaping. The mouth or lower open end of the bag 29 has a sleeved or looped border 30 extending around most of the peripheral edge of the mouth portion of the bag as better shown in FIGURE 5. The mouth portion of the bag is adapted to be held in a generally rectangular arrangement.

For supporting the bag in position alongside the mower 11, I provide a supporting rod or member 34. This rod 34 has an upper curved end portion 34A disposed as illustrated in FIGURE 1. I prefer to place the supporting rod 34 within the bag 29 so that the bag rests upon and is thus supported by the rod 34. The curve of the upper end portion 34A is such as to accommodate itself to the internal shape of the bag 29. For convenience in shipping and assembly, the rod 34 is in two pieces which are joined at the jointed portion 34B by nuts and bolts or other suitable means. The supporting rod or member 34 has a lower end portion 34C which extends around in a gradual curve, as illustrated, from being generally parallel to the path of travel of the mower to being generally parallel to the axis of the discharge chute 12 at its port. This lower end portion 34C terminates to form a terminal portion or pintle 34D which has a diameter adapted to extend into the socket portion 20 of the bracket 16.

A generally rectangular shaped frame portion 35 is rigidly secured by welding or other suitable means to the lower end portion 34C and is disposed in a plane substantially normal to the axis of the terminal portion or pintle 34D. This frame portion 35 has a free end 35A which is spaced somewhat from the lower end portion 34C as illustrated. The frame portion 35, of suitable metal bent to shape, has a portion 35B substantially at right angles to the plane of the frame portion 35 which is secured by welding or other suitable means to the lower end portion 34C of the supporting member 34.

There is an arm member 36 rigidly secured to the lower end portion 34C adjacent the terminal or pintle portion 34D. This arm member 36 is substantially at right angles to the axis of the terminal portion or pintle 34D. For convenience in fabrication, the arm 36 may be formed from an end of the same piece of metal rod of which the frame portion 35 is made, the arm 36 extending out from the end of the bent-over portion 35B as illustrated. The arm 36 is in a plane substantially parallel to the plane of the frame portion 35, both of these planes being substantially normal to the axis of the terminal portion or pintle 34D.

The bag is positioned on the supporting member 34 by moving the portion 34A upwardly in the bag through its mouth portion or, if desired, by moving the supporting rod or member 34 downwardly through the opened end 31 of the bag. The sleeved or looped border of the mouth portion of the bag is mounted on the frame 35 by inserting the free end 35A into an open end of the sleeved or looped border 30 and slidably moving the sleeved or looped border 30 around to the position illustrated in FIGURE 5 whereby the mouth portion is held open and in a generally rectangular configuration corresponding to the shape of the frame member 35.

The supporting rod or member 34 carrying the bag 29 thereon as illustrated is then mounted on the bracket by first tilting the supporting rod or member 34 so that the frame portion 35 is angularly disposed relative to the plane of the top wall 13 of the chute, as illustrated in broken lines in FIGURE 2. The supporting rod or member 34 is then moved toward the mower so that the terminal portion or pintle 34D is in axial alignment with the socket portion 20 while maintaining the tilted attitude of the supporting rod as illustrated whereby the arm 36 clears and goes over the top of the flange 19. The flange 18B is an abutment tending to stop further movement of the arm 36 toward the mower. Also the arm 36 abuts the outer end of the socket portion 20. In this axial movement of the pintle 34D into the socket portion 20, the upturned guiding portion 21 aids in guiding the pintle 34D in an axial direction so as to enter the open end of the socket 20. After the parts have reached the position illustrated in full lines in FIGURE 2, whereby the arm 36 is in a plane between the spaced parallel planes passing through flange 19 and aligned flanges 18A and 18B, the outer end of the rod or member 34 is lowered so as to swing the frame portion 35 downwardly to substantially register with the port of the chute 12. This lowers the arm 36 down to rest upon the plate portion 17 between the flange 19 on the one hand and the flanges 18A and 18B on the other hand. The flange 19 detains movement of the arm 36 away from flanges 18A and 18B and thus provides detention means which retains the pintle 34D in the socket portion 20 as illustrated in FIGURE 3. As the fit of the pintle 34D in the bore of the socket portion 20 may be rather loose or sloppy to facilitate the ready insertion and withdrawal of the pintle 34D from the socket 20, the flanges 18A and 18B by providing abutting means aid in maintaining the pintle 34D in proper axial alignment with the axis of the socket portion 20. When in this position of FIGURE 3, the mouth portion 30 of the bag 29 is held in alignment with the chute 12 so that grass clippings, leaves and other material blown out through the port of the chute 12 are blown into the bag 29 through the open mouth portion 30. For removal of the bag and its supporting member 34, the operation is reversed. The outer end of the rod or member 34 is raised so as to swing the arm 36 upwardly from its position shown in FIGURE 3 to where the arm clears the flange 19, such as shown in solid lines in FIGURE 2, and the rod is then moved bodily away from the mower so as to withdraw the pintle 34D from the socket portion 20. In this manner the bag 29 and its support member 34 may be completely removed from the mower upon which the bracket 16 is mounted.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. Apparatus for supporting a bag at the port end of a discharge chute of a mower for receiving grass clippings or the like discharged from said chute, said bag having a body portion adapted to be supported adjacent the mower and an open mouth portion adapted to be aligned generally with the port of said chute to communicate with the chute, said chute having an upper wall extending to the port end of said chute, comprising the combination of a bracket member having a plate portion, a socket portion and a flange portion, said plate portion being adapted to be secured to the said top wall of a chute, said socket portion being disposed with its axis directed generally horizontally and being open toward said port end of the chute, and said flange portion extending upwardly from said plate portion at a distance from the said axis of the socket portion and being disposed between said port end of the chute and a generally vertical reference plane extending at an angle to said axis, and a bag-supporting member having an upper end portion adapted to support the body portion of said bag adjacent a said mower and a lower end portion extending therefrom to be positioned adjacent said chute, said lower end portion having a terminal portion adapted to be inserted into said socket portion upon the axis of the terminal portion being aligned with the axis of the socket portion and the terminal portion moved axially into the said socket portion, an arm member extending rigidly from said terminal portion at an angle to the axis thereof and swingable in an arc about the axis of said terminal portion in said reference plane, said arm member in lowered position being adapted to rest upon said plate portion alongside said flange portion of the arm member whereby the terminal portion is held against withdrawal from said socket portion by said flange portion and may be withdrawn from said socket portion upon swinging of said arm upwardly to clear said flange portion, and a frame member carried by said lower end portion and at a distance from said arm member and adapted to engage and hold open said mouth portion of said bag, the frame member being generally in a plane transverse to the axis of said terminal portion and disposed to align the engaged mouth portion of said bag with said port upon said terminal portion being in said socket portion and said arm member in said lowered position.

2. Apparatus as claimed in claim 1 and including another flange portion extending upwardly from said plate portion at a distance from the said axis of the socket portion and spaced from said first flange portion to include said reference plane therebetween to maintain said arm member in said reference plane upon being swung to lowered position on said plate portion.

3. Apparatus as claimed in claim 1 and including an upturned edge portion extending upwardly from said plate portion concentric with the axis of said socket portion and in alignment with a side wall of the socket portion to guide said terminal portion of the bag supporting member in being moved axially into said socket portion.

4. The combination of a bracket member adapted to be carried by a mower adjacent the port of the discharge chute thereof and a bag-supporting member adapted to be readily attached to said bracket for the locating of a bag adjacent the mower to position the mouth portion of the bag in line with the said chute to receive material discharged from the port of the chute, said bracket member having a mounting portion adapted to be secured to a wall of said chute, a socket portion arranged on said bracket member to have its axis disposed generally parallel to the axis of said chute upon the securing of the mounting portion on said chute, and a detention portion extending upwardly from the mounting portion at a distance from the axis of said socket portion, said bag-supporting member having a first end portion adapted to support a said bag and a second end portion, said second end portion including a terminal portion adapted to be inserted into said socket portion upon being moved axially substantially parallel to the axis of said chute and toward said socket portion, said second end portion including an arm portion rigidly extending therefrom at an angle to the axis of the said terminal portion and rockable with said second end portion about said axis of the terminal portion inserted in said socket portion between lowered and raised positions relative to said detention portion of said bracket member, said detention portion being located between a vertical plane passing through the port of said discharge chute and a vertical plane passing through said arm portion in said lowered position upon the terminal portion being in said socket portion whereby the detention portion blocks such movement of the arm portion in said lowered position toward said port as to prevent withdrawal of the terminal portion from said socket portion, said second end portion of the bag-supporting means including frame means for holding the mouth portion of the said bag open and in general registration with the port of said chute for receiving material discharged therefrom.

5. The combination as claimed in claim 4 and including a wall portion carried by said mounting portion in alignment with one side only of said socket portion concentric with the axis of said socket portion for engaging and guiding said terminal portion into said socket portion upon movement of the terminal portion toward said socket portion.

6. The combination as claimed in claim 4 and including a confining portion at a distance from said socket portion extending upwardly from the said mounting portion parallel to, and spaced from, said detention portion for accommodating said arm portion therebetween in its lowered position and confining the same in said lowered position.

7. Apparatus for supporting a bag in position alongside a mower for receiving material discharged from the discharge chute of the mower, comprising the combination of bracket means adapted to be secured to said mower adjacent said chute, said bracket means including socket means and detention means, and bag-supporting means, said bag-supporting means including pintle means insertable into said socket means, arm means extending at an angle to the axis of the pintle means and rockable in an arc about the axis of the pintle means to lowered position and raised position upon rotation of the pintle means in said socket means, said detention means being positioned relative to said socket means for receiving the arm means upon the arm means being in lowered position for blocking movement of the arm means in a direction permitting withdrawal of the pintle means from the socket means upon the arm means being in lowered position, said arm means upon being in raised position being clear of said detention means for permitting withdrawal of the pintle means from the socket means.

8. Apparatus as claimed in claim 7 and in which said bag-supporting means includes frame means for holding the mouth of the bag open and in alignment with said chute to receive material discharge from the port of the chute.

9. Apparatus as defined in claim 8 and including guide means carried by the bracket means in alignment with one side wall of the socket means for guiding axial movement of the pintle means into said socket means.

10. Apparatus as defined in claim 8 and including confining means carried by the bracket means for confining the arms means at said angle to the axis of the pintle means and adjacent the detention means upon the arm means being in lowered position.

References Cited by the Examiner
UNITED STATES PATENTS
2,932,146   4/1960   Campbell _____ 56—202

ABRAHAM G. STONE, *Primary Examiner.*

ANTONIO F. GUIDA, *Examiner.*